United States Patent
Tetsuka et al.

(10) Patent No.: US 7,516,616 B2
(45) Date of Patent: Apr. 14, 2009

(54) BICYCLE HYDRAULIC BRAKE ACTUATION DEVICE

(75) Inventors: Toshio Tetsuka, Sakai (JP); Osamu Kariyama, Sakai (JP)

(73) Assignee: Shimano Inc., Osaka (JP)

( * ) Notice: Subject to any disclaimer, the term of this patent is extended or adjusted under 35 U.S.C. 154(b) by 337 days.

(21) Appl. No.: 11/449,695

(22) Filed: Jun. 9, 2006

(65) Prior Publication Data
US 2007/0283692 A1    Dec. 13, 2007

(51) Int. Cl.
*F15B 7/08*    (2006.01)
(52) U.S. Cl. ............... 60/533; 60/584; 60/594
(58) Field of Classification Search ........... 60/533, 60/584, 594
See application file for complete search history.

(56) References Cited

U.S. PATENT DOCUMENTS

| | | | | |
|---|---|---|---|---|
| 2,197,012 A | * | 4/1940 | Sauzedde | 60/576 |
| 4,176,886 A | * | 12/1979 | Watanabe | 60/581 |
| 4,896,753 A | * | 1/1990 | Sule | 92/40 |
| 5,636,518 A | * | 6/1997 | Burgoyne et al. | 60/594 |
| 5,678,665 A | | 10/1997 | Debreczeni | |
| 6,491,144 B2 | | 12/2002 | Ueda et al. | |

FOREIGN PATENT DOCUMENTS

| | | |
|---|---|---|
| JP | 10-230886 | 9/1998 |
| TW | 556707 Y | 10/2003 |
| TW | M266236 U | 6/2005 |

OTHER PUBLICATIONS

U.S. Appl. No. 11/061,358, filed Feb. 18, 2005, Takizawa et al.

* cited by examiner

*Primary Examiner*—Igor Kershteyn
(74) *Attorney, Agent, or Firm*—Global IP Counselors, LLP

(57) ABSTRACT

A bicycle hydraulic brake actuation device includes a hydraulic master cylinder housing having a bore and a push rod guide surface, a master piston and a radial seal received in the bore, a push rod and a lever. The push rod is supported by the push rod guide surface for sliding movement within the hydraulic master cylinder housing. The push rod is configured to move the master piston and the radial seal from a neutral position to a braking position. The lever is pivotally attached to the housing for pivotal movement between an at rest position and a brake actuation position. The lever is also configured and arranged to move the push rod and the master piston from the neutral position toward the braking position as the lever is pivoted between the at rest position and the brake actuation position.

8 Claims, 18 Drawing Sheets

BICYCLE HYDRAULIC BRAKE ACTUATION DEVICE

BACKGROUND OF THE INVENTION

1. Field of the Invention

This invention generally relates to bicycle hydraulic brake actuation device. More specifically, the present invention relates to bicycle hydraulic brake actuation device that provides improved braking characteristics in a braking system.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One system that has been extensively redesigned is the hydraulic brake system.

The bicycle hydraulic brake system typically includes the hydraulic brake actuation device, a rotor attached to one of the bicycle wheels and a caliper adjacent to the rotor with brake pads that selectively contact the rotor in response to changes in hydraulic pressure in the hydraulic brake actuation device.

The hydraulic brake actuation device typically has a housing mounted the bicycle handlebar. The housing includes a bore, a master piston disposed in the bore and a lever arm pivotally supported on the housing. Pivoting movement of the lever arm provides leverage for moving the master piston causing changes in the hydraulic pressure and movement of a slave piston in the caliper. Typically, the brake pads are spaced apart from braking surfaces of the rotor until urged into braking contact with the rotor by movement of the slave piston.

When the lever arm of the hydraulic brake actuation device is initially moved, braking contact is delayed because the brake pads must first move and close the gap between the brake pads and the braking surfaces of the rotor. The movement of the brake pads typically corresponds directly movement of the lever arm in a movement ratio. Specifically, for each angular degree of movement of the lever arm, there is a corresponding movement of the brake pads.

It is desirable to have the brake pads move quickly toward the braking surfaces of the rotor in order to provide rapid braking response. However, in conventional hydraulic brake actuation devices, movement of the pads to the rotor requires an undesirable amount of lever arm travel.

In view of the above, it will be apparent to those skilled in the art from this disclosure that there exists a need for an improved hydraulic brake actuation device that provides improved ratio of the movement of the brake pads relative to the movement of the lever arm. This invention addresses this need in the art as well as other needs, which will become apparent to those skilled in the art from this disclosure.

SUMMARY OF THE INVENTION

One object of the present invention is to provide a hydraulic brake actuation device with an improved master piston movement response.

Another object of the present invention is to provide push rod/roller and lever configuration within a hydraulic brake actuation device that improves braking response.

Yet another object of the present invention is to provide a hydraulic brake actuation device configured to respond to lever movement with a first lever to piston movement ratio in a first portion of lever travel and a second lever to piston movement ratio in a second portion of lever travel.

The foregoing objects can basically be attained by providing a bicycle hydraulic brake actuation device with a hydraulic master cylinder housing having a bore and a push rod guide surface, a master piston and a radial seal received in the bore, a push rod and a lever. The push rod is supported by the push rod guide surface for sliding movement within the hydraulic master cylinder housing. The push rod is configured to move the master piston and the radial seal from a neutral position to a braking position. The lever is pivotally attached to the housing for pivotal movement between an at rest position and a brake actuation position. The lever is also configured and arranged to move the push rod and the master piston from the neutral position toward the braking position as the lever is pivoted between the at rest position and the brake actuation position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
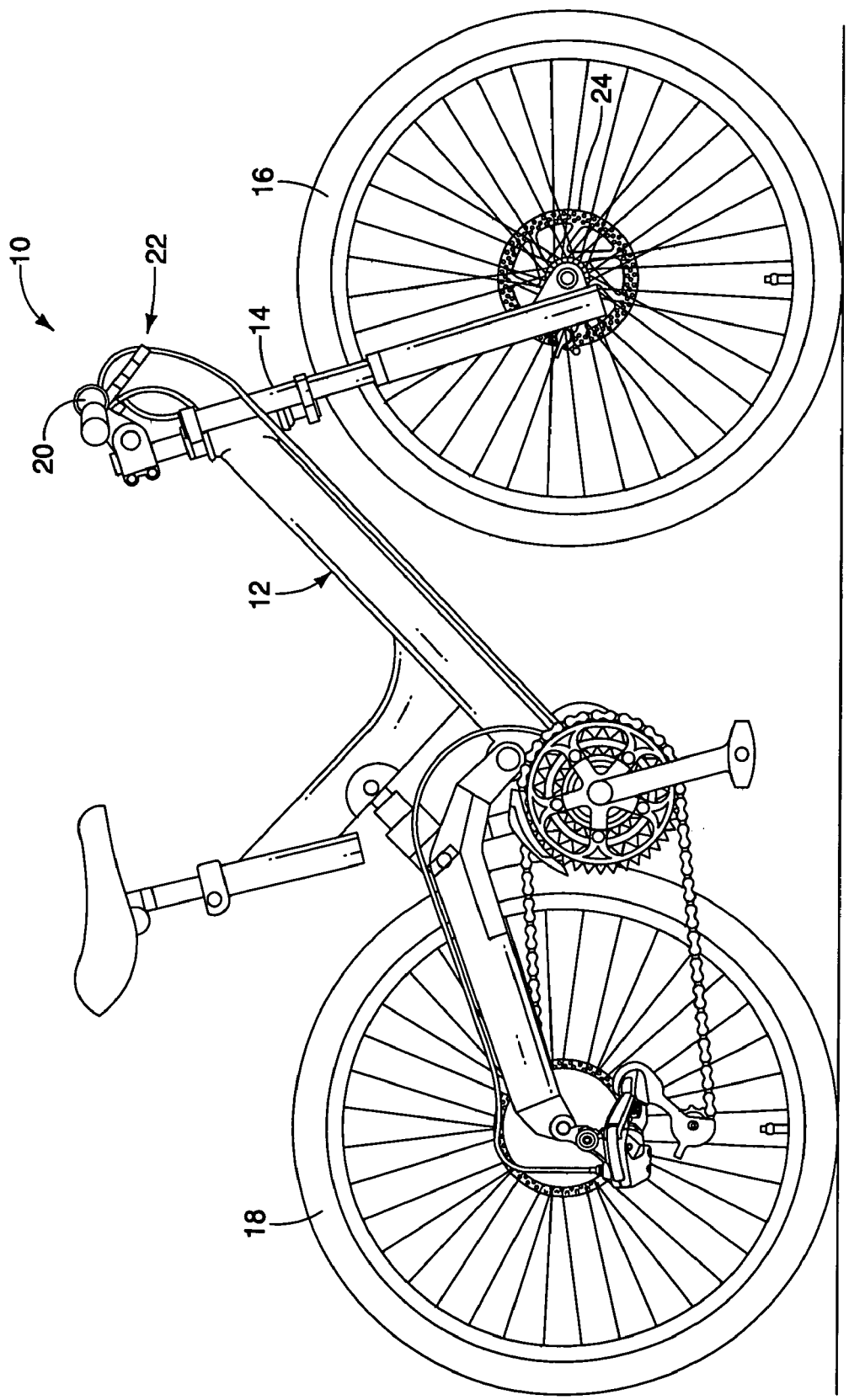
FIG. 1 is a side view of a bicycle that includes a hydraulic brake actuation device in accordance with the present invention.

Referring initially to FIG. 1, a bicycle 10 is illustrated in accordance with a first embodiment of the present invention. Among other things, the bicycle 10 includes a frame 12, a front fork 14, a front wheel 16, a rear wheel 18, a handlebar 20 and a hydraulic braking system 22. The front fork 14 is pivotally supported on the frame 12. The front wheel 16 is rotatably supported on the front fork 14 and the rear wheel 18 is rotatably supported on a rear portion of the frame 12 in a conventional manner.

The description below of the hydraulic braking system 22 is directed to a braking system configured for applying a braking force to the front wheel 16. However, it should be understood that from the drawings and the description herein that the bicycle 10 includes a separate braking system configured for applying a braking force to the rear wheel 18. Since front and rear bicycle brake systems have the same components and operate in the same manner, only the hydraulic brake system 22 installed for applying a braking force to the front wheel 16 is described herein for the sake of brevity. Specifically, the description herein of the hydraulic braking system 22 applies to both front and rear braking systems.

Figure 2:
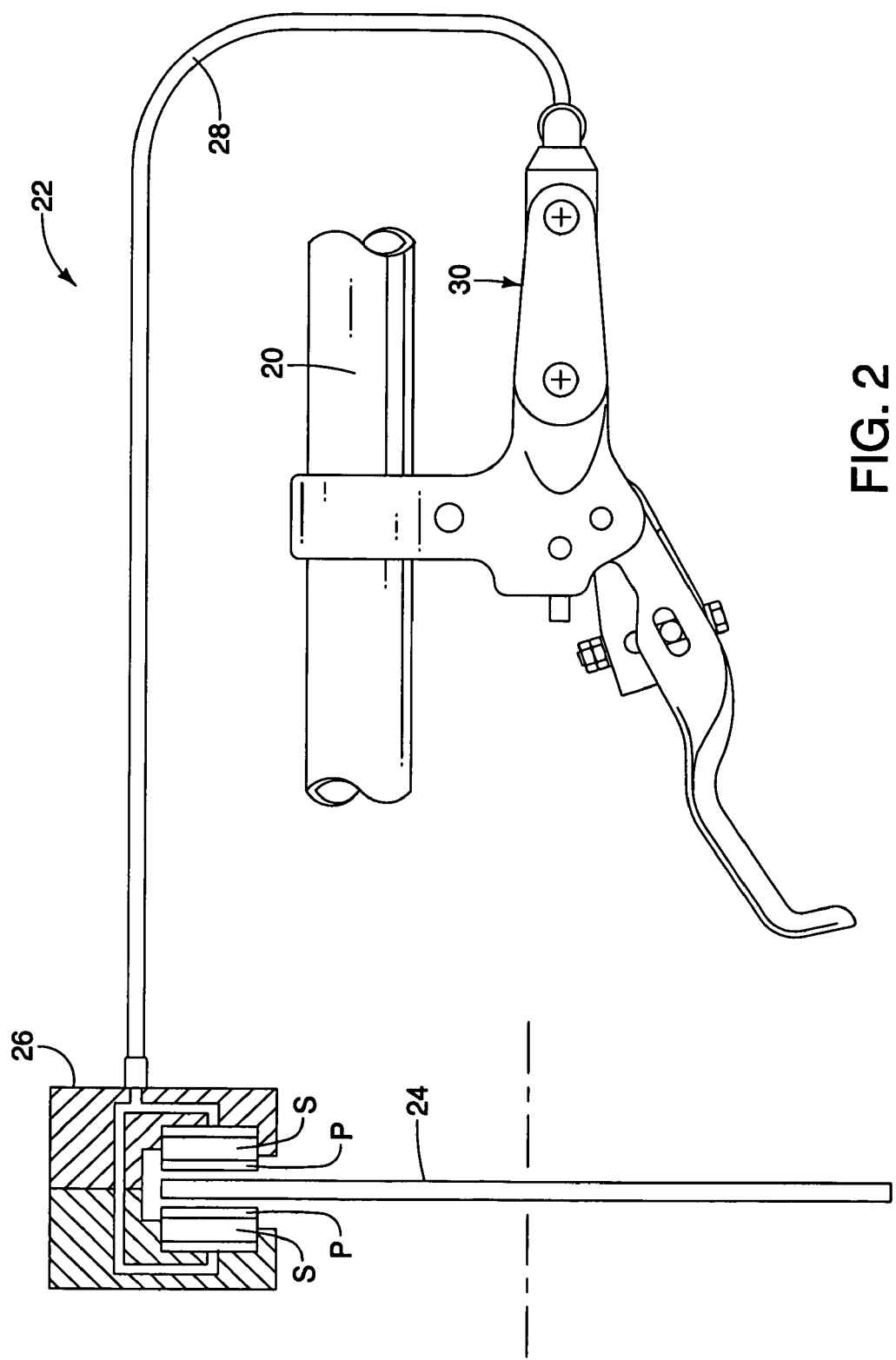
FIG. 2 is a schematic view of the hydraulic brake actuation device showing the hydraulic brake actuation device operably connected to a brake caliper in accordance with a first embodiment of the present invention.
Figure 3:
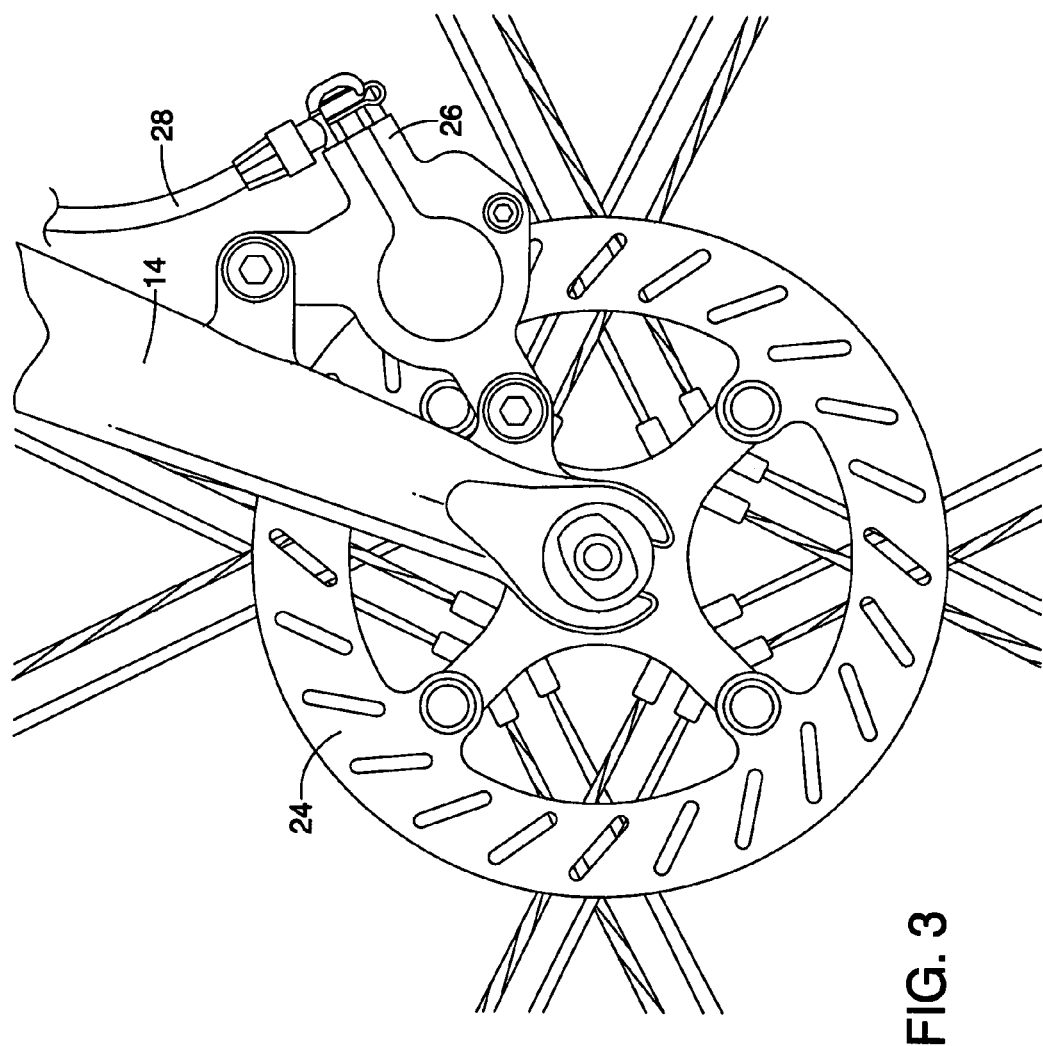
FIG. 3 is a side view of a portion of a front wheel of the bicycle depicted in FIG. 1 showing the brake caliper and a brake rotor in accordance with a first embodiment of the present invention.

As shown in FIG. 2, the hydraulic braking system 22 basically includes a rotor 24, a brake caliper 26, a hydraulic line 28 and a hydraulic brake actuation device 30. The brake caliper 26 is a slave cylinder and the hydraulic brake actuation device 30 is a master cylinder in the hydraulic braking system 22. As shown in FIG. 3, the rotor 24 is attached to the front wheel 16. The brake caliper 26 is fixed to the front fork 14 adjacent to the rotor 24 in a conventional manner.

Referring again to FIG. 2, the brake caliper 26 includes a slave piston S and brake pads P. The hydraulic line 28 is connected to both the brake caliper 26 and the hydraulic brake actuation device 30 such that increases in fluid pressure within the hydraulic brake actuation device 30 directed to the brake caliper 26 cause the slave piston S to move, thereby moving the brake pads P into contact with the rotor 24 and applying a braking force the front wheel 16. As also shown in FIG. 2, the hydraulic brake actuation device 30 is secured to the handlebar 20.

With specific reference to FIGS. 4-10, a detailed description of the hydraulic brake actuation device 30 in accordance with the present invention is now provided.

Figure 5:
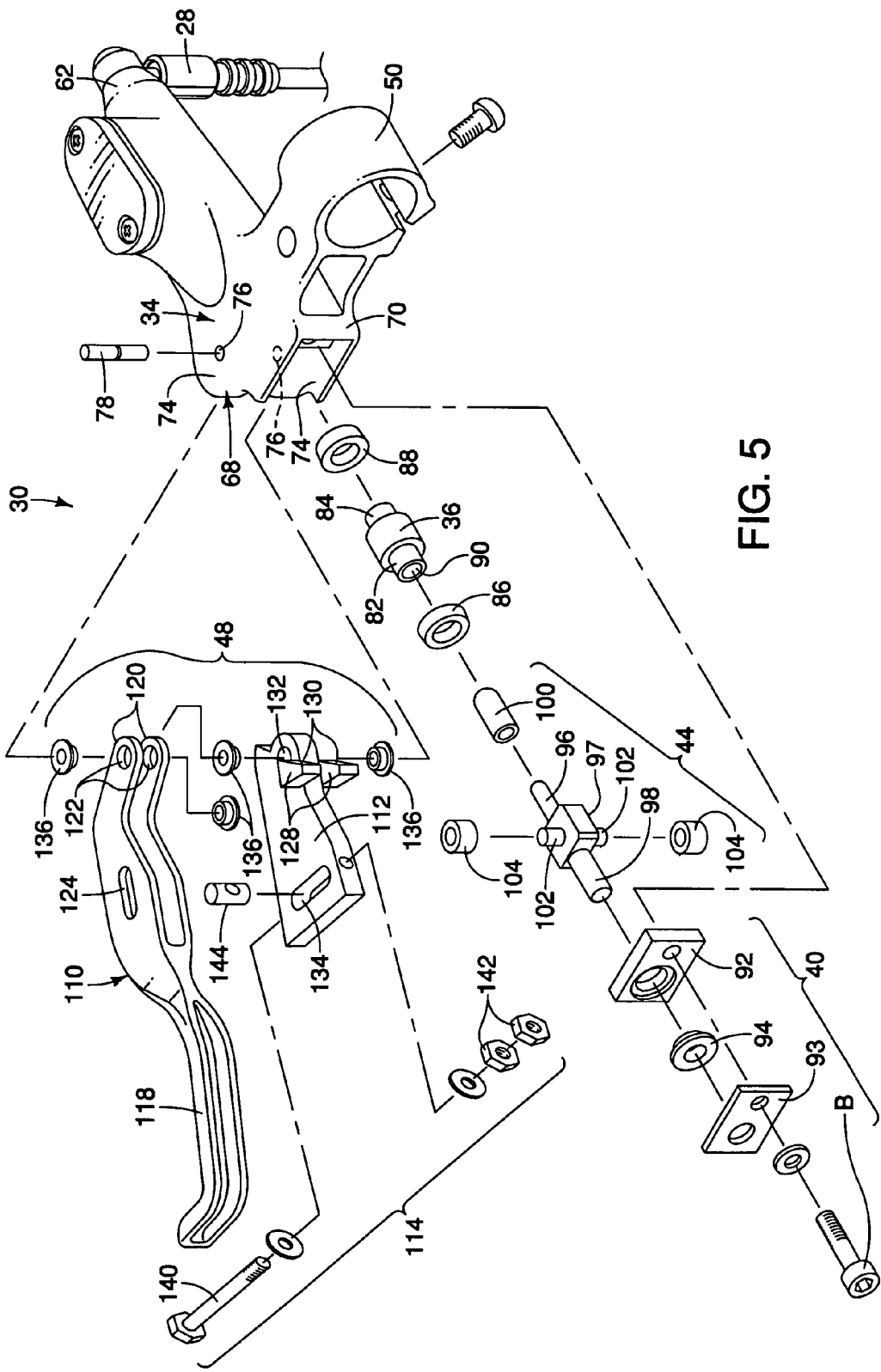
FIG. 5 is a perspective exploded view of the hydraulic brake actuation device in accordance with the first embodiment of the present invention.
Figure 6:
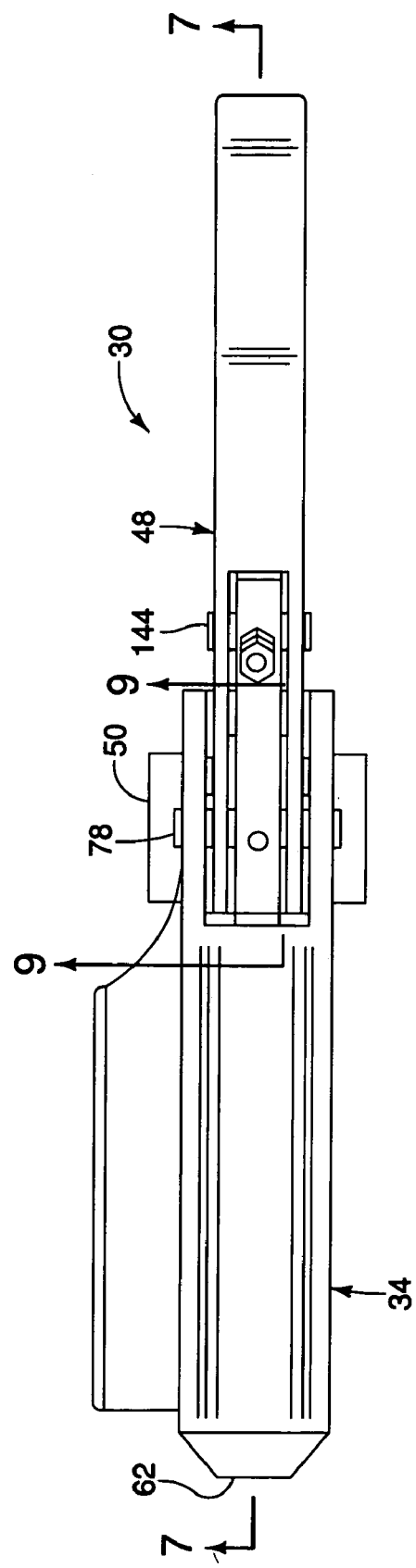
FIG. 6 is a side elevational view of the hydraulic brake actuation device in accordance with the first embodiment of the present invention.

As best shown in FIG. 5, the hydraulic brake actuation device 30 basically includes a hydraulic master cylinder housing 34, a piston 36, a movement restricting portion 40, a push rod 44 and a lever assembly 48.

Figure 4:
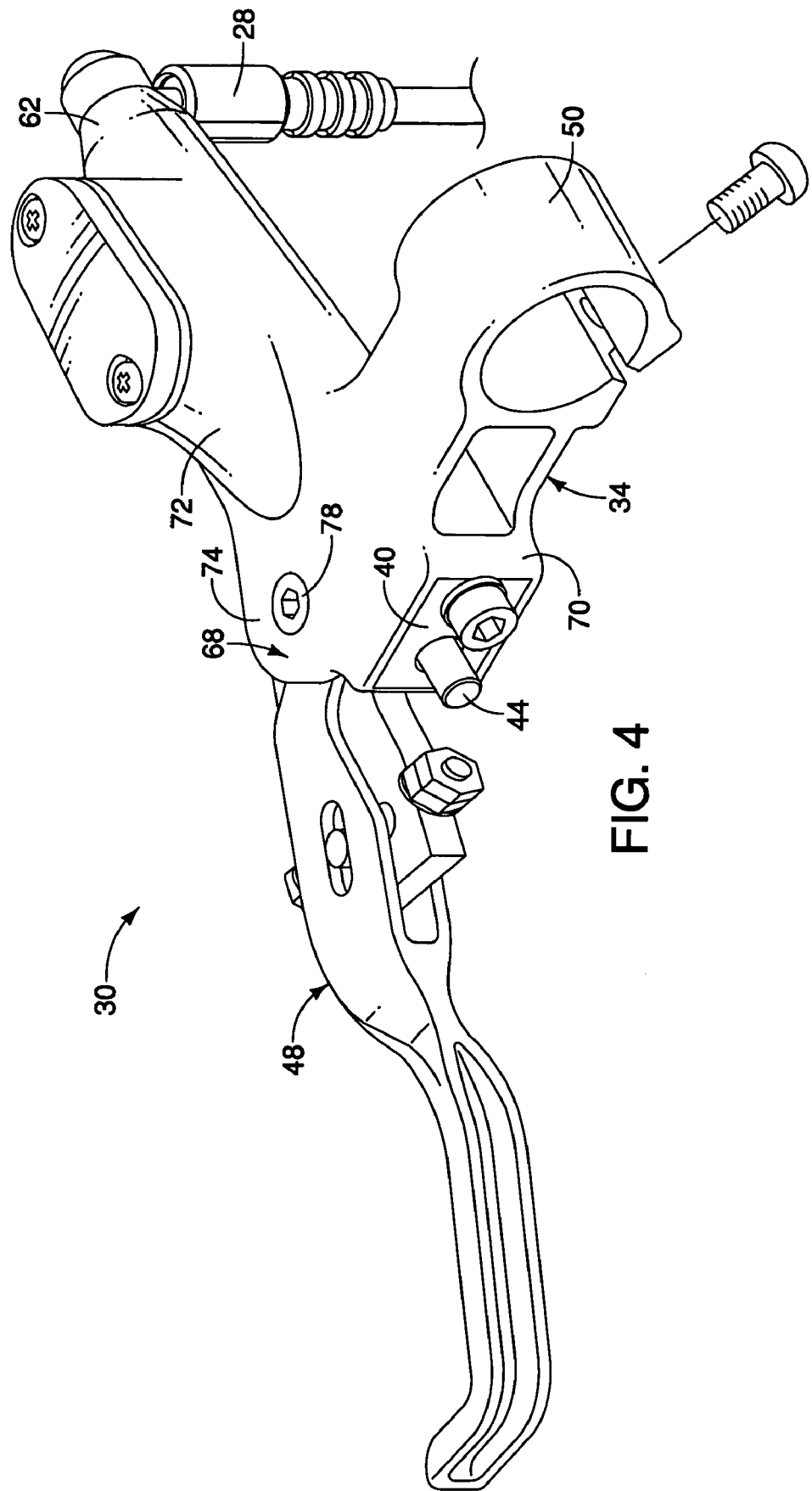
FIG. 4 is a perspective view of the hydraulic brake actuation device shown removed from the bicycle in accordance with the first embodiment of the present invention.
Figure 7:
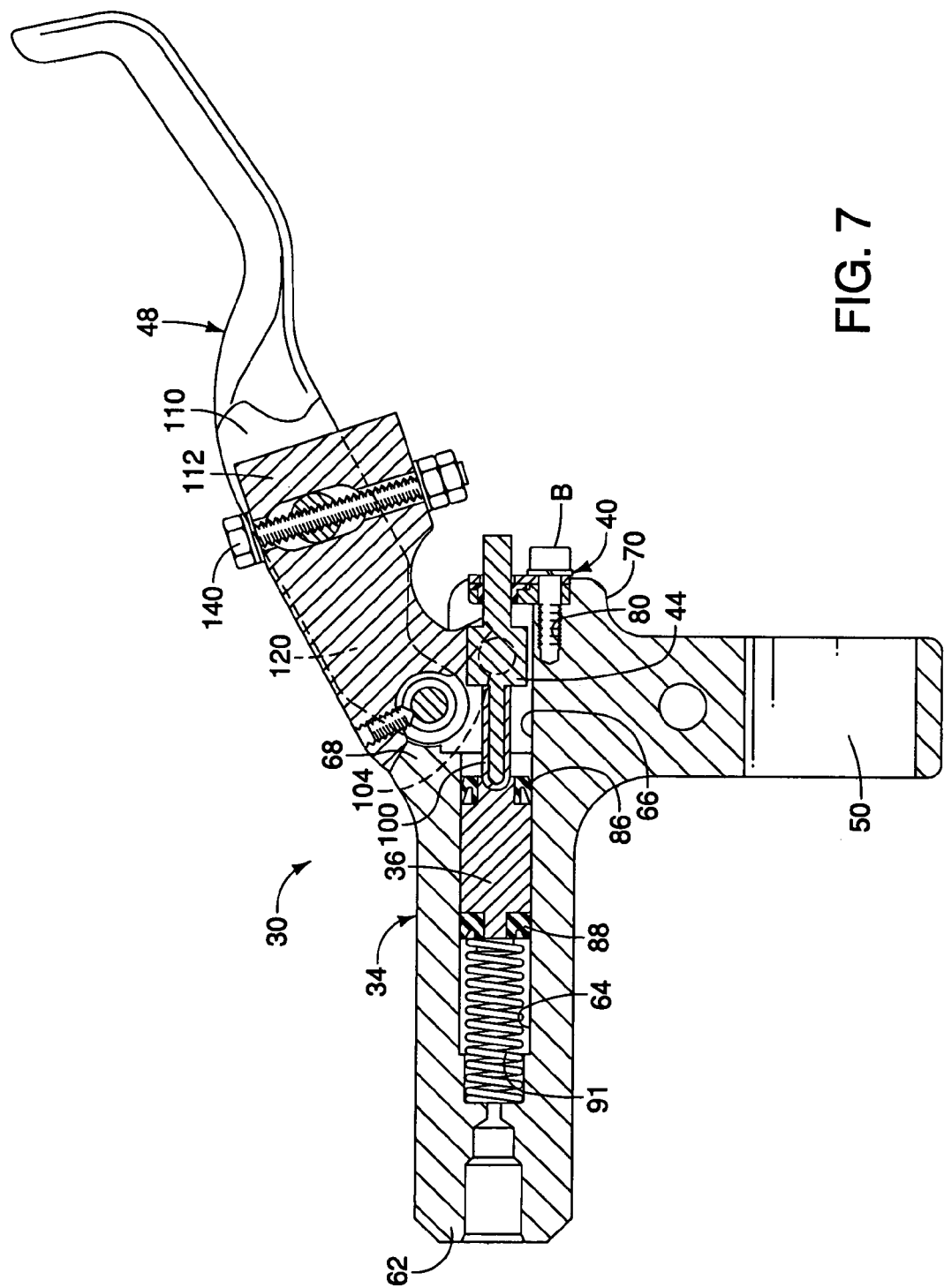
FIG. 7 is a cross-sectional view of the hydraulic brake actuation device taken along the line 7-7 in FIG. 6 showing details of a lever, a push rod and a piston with the lever in an at rest position and the piston in a neutral position in accordance with the first embodiment of the present invention.
Figure 8:
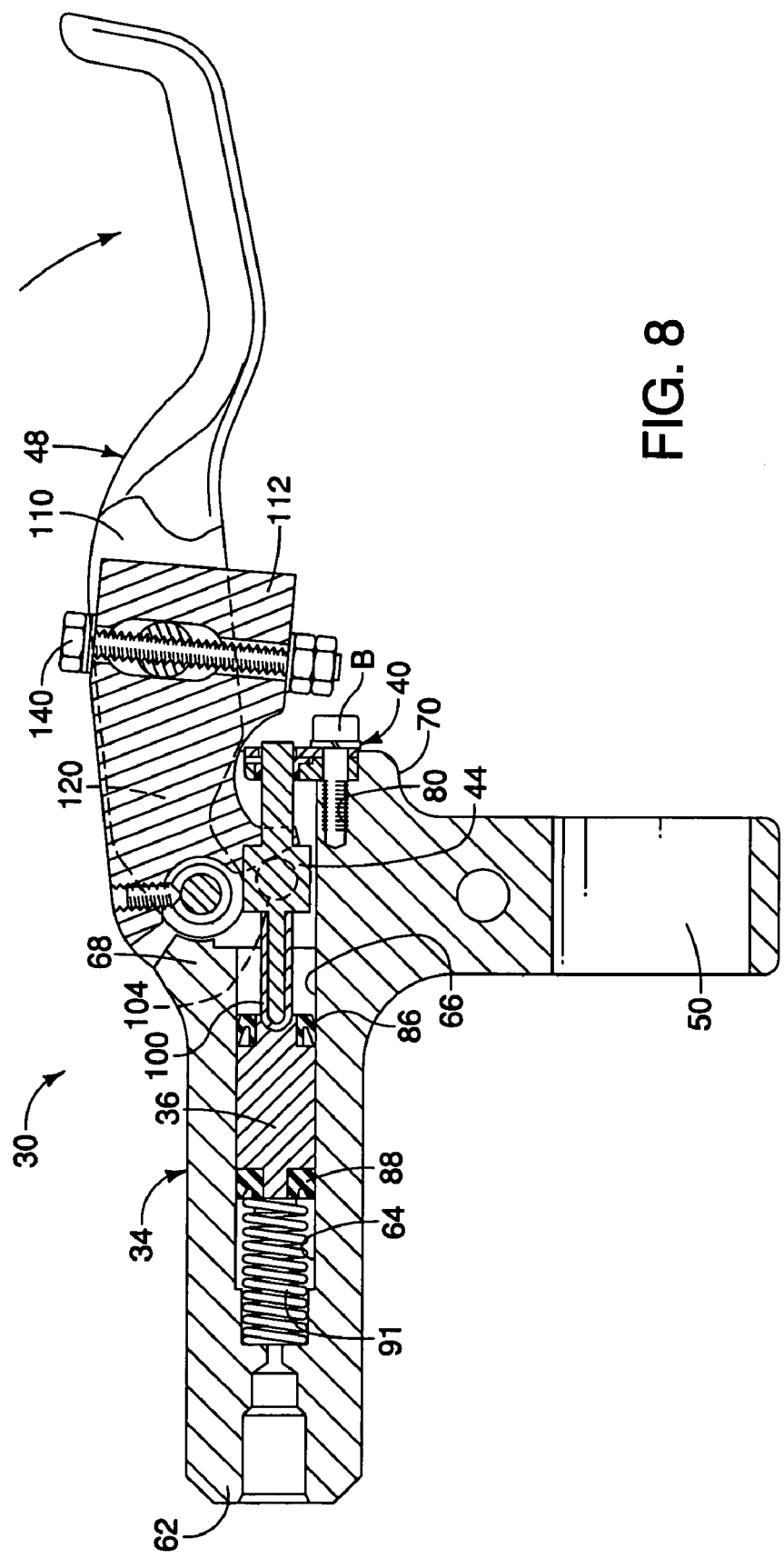
FIG. 8 is a cross-sectional view of the hydraulic brake actuation device similar to FIG. 7, with the lever in a brake actuation position and the piston in a braking position in accordance with the first embodiment of the present invention.

As best shown in FIGS. 7 and 8, the hydraulic master cylinder housing 34 basically includes a handlebar attachment portion 50, a hydraulic line attachment end 62, a cylinder bore 64, a recess 66, a lever supporting portion 68 and a push rod supporting end 70. As best shown in FIG. 4, the hydraulic master cylinder housing 34 also includes a brake fluid reservoir 72.

Figure 9:
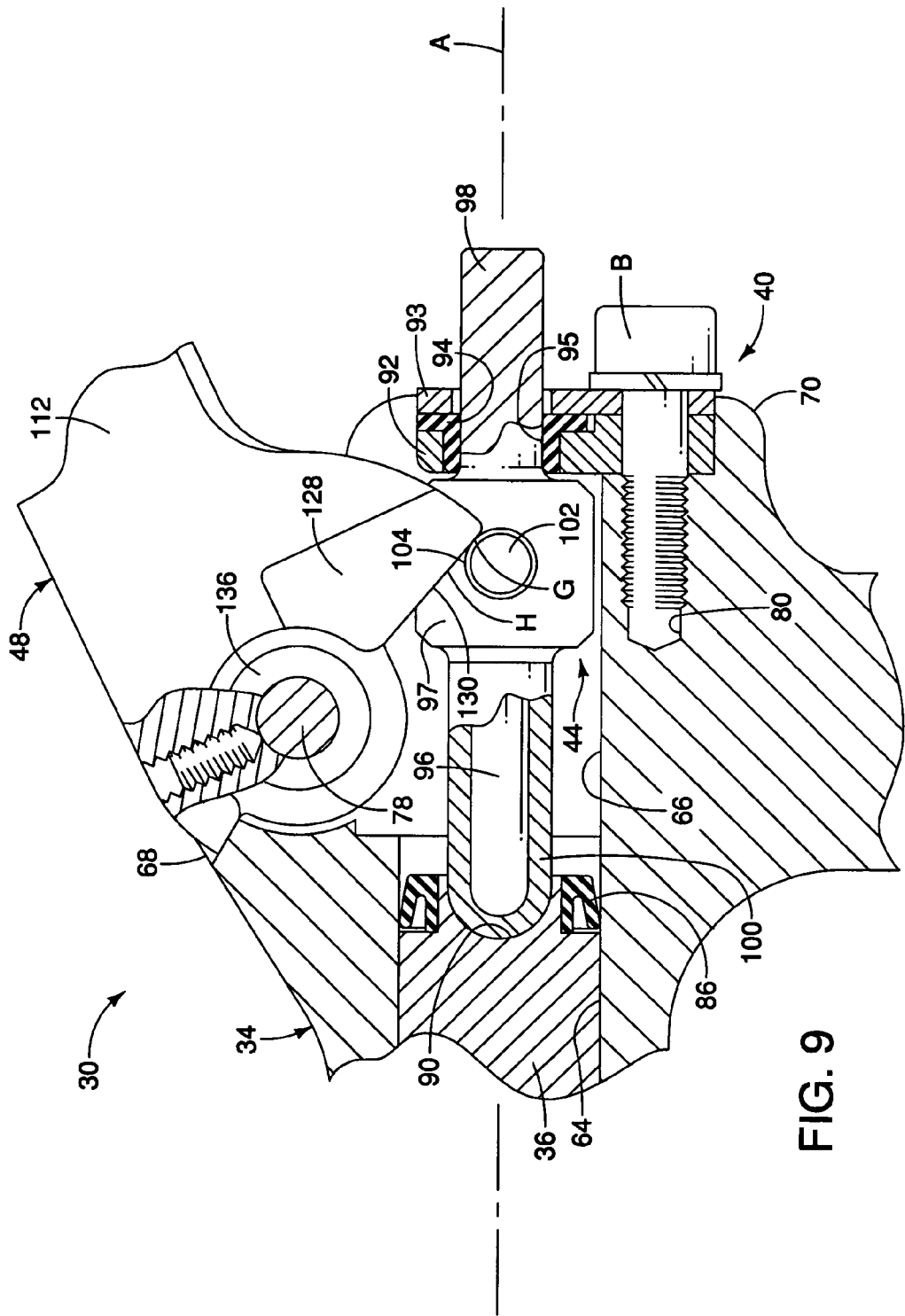
FIG. 9 is a cross-sectional view of the hydraulic brake actuation device taken along the line 9-9 in FIG. 6 showing a cam surface on the lever in contact with a roller of the push rod with the lever in the rest position and the piston in a neutral position in accordance with the first embodiment of the present invention.
Figure 10:
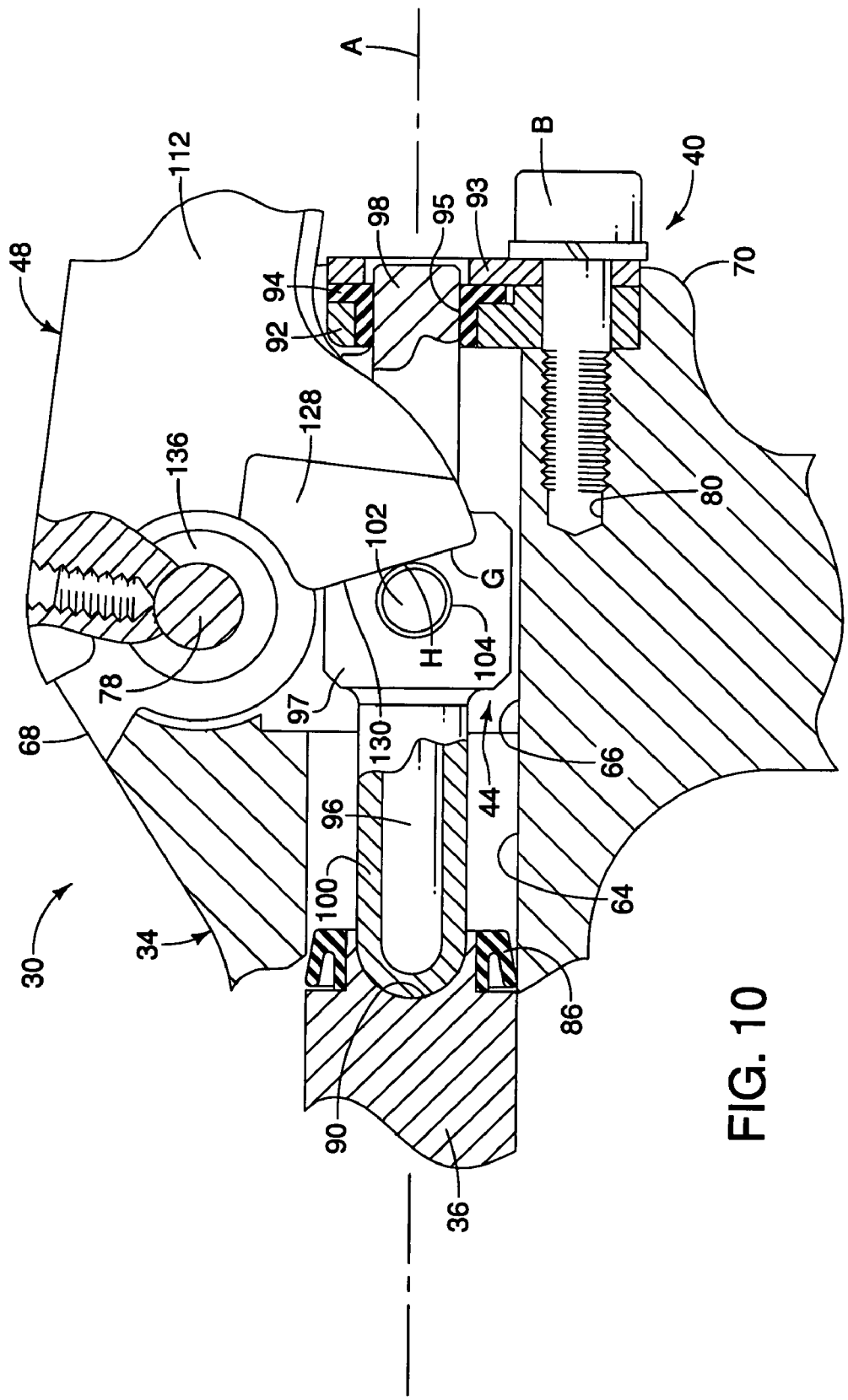
FIG. 10 is a cross-sectional view of the hydraulic brake actuation device similar to FIG. 9, with the lever in a brake actuation position and the piston in a braking position in accordance with the first embodiment of the present invention.

Returning again to FIGS. 7 and 8, the hydraulic line attachment end 62 is dimensioned to connect to the hydraulic line 28 in a conventional manner. As shown in FIGS. 9 and 10, the cylinder bore 64 defines an axis A and is dimensioned to receive the piston 36 such that the piston 36 slides within the cylinder bore 64 along the axis A. The recess 66 is dimensioned to receive the push rod 44 such that the push rod 44 can move within the recess 66 contacting a portion of the piston 36 as is described in greater detail below.

As best shown in FIG. 5, the lever supporting portion 68 is defined by two spaced apart side walls 74. The two side walls 74 are each formed with a bore 76. A pivot pin 78 is fitted into the bores 76 pivotally supporting the lever assembly 48 in a manner described in greater detail below. As shown in FIGS. 7-10, the push rod supporting end 70 of the hydraulic master cylinder housing 34 includes a threaded aperture 80.

With specific reference to FIGS. 5 and 7-10, a detailed description of the piston 36 is now described. The piston 36 serves as a master piston for the hydraulic braking system 22. Movement of the piston 36 (a master piston) causes corresponding movement of the slave piston S in the brake caliper 26 in accordance with corresponding increases in the fluid pressure within the hydraulic master cylinder housing 34.

The piston 36 is basically a cylindrically shaped member that basically includes seal receiving recesses 82 and 84 fitted with seals 86 and 88 and a push rod receiving end 90. The seals 86 and 88 are radial seals that extend around the outer circumference of the recesses 82 and 84. The seals 86 and 88 create a fluid seal between the cylinder bore 64 and the piston 36. The push rod receiving end 90 includes a concaved surface.

The piston 36 and the seals 86 and 88 are configured to move between a neutral position shown in FIGS. 7 and 9 and a braking position shown in FIGS. 8 and 10. The piston 36 serving as the master piston is biased into the neutral position (FIGS. 7 and 9) by a return spring 91 (FIGS. 7 and 8) that is also disposed within the cylinder bore 64.

As shown in FIGS. 5 and 7-10, the movement restricting portion 40 includes a first plate 92, a second plate 93, a bushing 94 and a bolt B. The first plate 92 is formed with a recess dimensioned to receive the bushing 94. The bushing 94 includes a central opening that has an inner annular surface (see FIGS. 9 and 10) that defines a push rod guide surface 95, as described in greater detail below with the description of the push rod 44. The first plate 92 and second plate 93 include aligned apertures that receive the bolt B, such that the bolt B attaches the movement restricting portion 40 to the push rod supporting end 70 of the hydraulic master cylinder housing 34. Specifically, the bolt B threads into the threaded aperture 80. With the movement restricting portion 40 installed on the push rod supporting end 70 of the hydraulic master cylinder housing 34, the push rod guide surface 95 is preferably aligned with the cylinder bore 64 and with the direction of movement of the piston 36.

With specific reference to FIGS. 5 and 7-10, a description of the push rod 44 is now provided. The push rod 44 is configured to move the piston 36 and the seals 86 and 88 to the braking position (FIGS. 8 and 10) in order to increase fluid pressure within the cylinder bore 64 causing the slave piston S in the brake caliper 26 to move the braking pads P to exert a braking force on the rotor 24.

As best shown in FIG. 5, the push rod 44 basically includes a piston contact portion 96, a lever contact portion 97 and a guided portion 98, with the lever contact portion 97 being disposed between the contact portion 96 and the guided portion 98. The piston contact portion 96 includes a cap 100 that is preferably made of a friction reducing material has an opening shaped to fit onto the piston contact portion 96 and a master piston contact end that conforms to the concaved surface the push rod receiving end 90 of the piston 36.

The lever contact portion 97 is located in a longitudinal central portion of the push rod 44 and includes opposing shafts 102 that extend from opposite sides of the lever contact portion 97. The lever contact portion 97 further includes a pair of rollers 104, one roller 104 being installed on each of the shafts 102. The rollers 104 are spaced apart from one another on opposite sides of the lever contact portion 97. Consequently, the rollers 104 are supported for rotational movement at the longitudinal central portion of the push rod 44. The outer circumferential surface of the rollers 104 define a cam surface contacting portion, as described in greater detail below.

The rollers 104 can be made of metal, nylon or a friction reducing material. The rollers 104 can be rotatable sleeves as shown or can include internal bearings that contact the shafts 102 to provide smooth rolling about the shafts 102. The rollers 104 are cam rollers that are supported for rotational movement on the shafts 102 as described in greater detail below.

The guide portion 98 of the push rod 44 is basically an elongated rod or shaft that contacts the push rod guide surface 95. Specifically, the guide portion 98 extends through the bushing 94 such that the annular shape of the push rod guide surface 95 encircles a section of the guide portion 98 of the push rod 44. Consequently, the push rod 44 is confined between the push rod guide surface 95 and the piston 36. Further, since the push rod 44 is so confined, the push rod 44 is restricted to linear movement in coaxial alignment with the axis A of the cylinder bore 64 corresponding to the direction of movement of the piston 36. As such, the hydraulic master cylinder housing 34 therefore includes the movement restricting portion 40 that receives a portion of the push rod 44. The movement restricting portion 40 is configured to limit the push rod 44 to linear movement.

With reference to FIGS. 5, 7 and 8, a description of the lever assembly 48 is now provided. The lever assembly 48 is pivotally attached to the hydraulic master cylinder housing 34 for pivotal movement about the pivot pin 78 between an at rest position shown in FIG. 7 and a brake actuation position shown in FIG. 8. The lever assembly 48 basically includes a lever member 110, a block member 112 and a reach adjustment mechanism 114. The lever member 110 includes a grip end 118 and a pair of generally parallel extensions 120 extending from the grip end 118. Each of the extensions 120 is formed with an aperture 122 at a pivot end thereof, with the apertures 122 being coaxially aligned. Each of the extensions 120 is further formed with an elongated opening 124 which is a part of the reach adjustment mechanism 114.

The block member 112 includes a cam surface that is defined on a pair of cam protrusions 128. Each cam protrusion 128 has a cam surface area 130. The two cam surface areas 130 define the cam surface of the block member 112. The block member 112 also includes an aperture 132 about which the block member 112 pivots, and an elongated slot 134 that is part of the reach adjustment mechanism 114.

The lever assembly 48 is pivotally supported on the lever supporting portion 68 of the hydraulic master cylinder housing 34 by the pivot pin 78. Specifically, bushings 136 are installed in each of the apertures 122 of the lever member 110 and in the aperture 132 of the block member 112. With the block member 112 inserted between the extensions 120 of the lever member 110 and the aperture 132 aligned with the apertures 122, the lever assembly 48 is inserted between the two spaced apart side walls 74 of the lever supporting portion 68. With the apertures 112 and 132 and the bores 76 in the side walls 74 aligned, the pivot pin 78 is fitted into the apertures 112 and 132 and the bores 76 thereby pivotally supporting the lever assembly 48 on the hydraulic master cylinder housing 34.

The reach adjustment mechanism 114 basically includes a bolt 140, nuts 142 and a pin 144. The pin 144 is inserted into the elongated slot 134 and elongated opening 124 and the bolt 140 is inserted into holes formed in the block member 144 and through a threaded hole formed in the pin 144. The reach adjustment mechanism 114 provides a reach adjustment feature to adjust the at rest position of the lever member 110.

As is shown in FIGS. 9 and 10, the cam surface areas 130 (contact surface) are configured and arranged to move the push rod 44 as the lever assembly 48 is pivoted between the at rest position (FIG. 9) and the brake actuation position (FIG. 10). As should be clear from the drawings, the cam surface areas 130 are spaced apart in order to extend to opposite sides of the push rod 44 and contact the rollers 104 (the cam surface contacting portion). The cam surface areas 130 are generally planar, however it should be understood from the drawings and the description herein that the cam surfaces can alternatively have a curved or arcuate contour.

As can be clearly seen in FIG. 9, the rollers 104 contact the cam surface areas 130 at a point G. In FIG. 10, the rollers 104 contact the cam surface areas 130 at a point H. The point G is farther away from the pivot pin 78 than the point H. A simple kinematics analysis of the movement of the lever assembly 48 verses the movement of the piston 36 (and the push rod 44) shows that there are at least two different lever ratios defined by their respective movements.

A first lever ratio is defined as a linear movement distance of the piston 36 relative to an angular movement distance of the lever assembly 48 with the lever assembly 48 proximate the at rest position (for example, with rollers 104 in contact with the cam surface areas 130 in the vicinity of the point G) and the piston 36 proximate the neutral position (FIG. 9).

A second lever ratio is defined as a linear movement distance of the piston 36 relative to an angular movement distance of the lever assembly 48 with the lever assembly 48 proximate the brake actuation position (for example, with rollers 104 in contact with the cam surface areas 130 in the vicinity of the point H) and the piston 36 proximate the braking position (FIG. 10). The first lever ratio is different from the second lever ratio. Specifically, the first lever ratio is greater than the second lever ratio.

Figure 19:
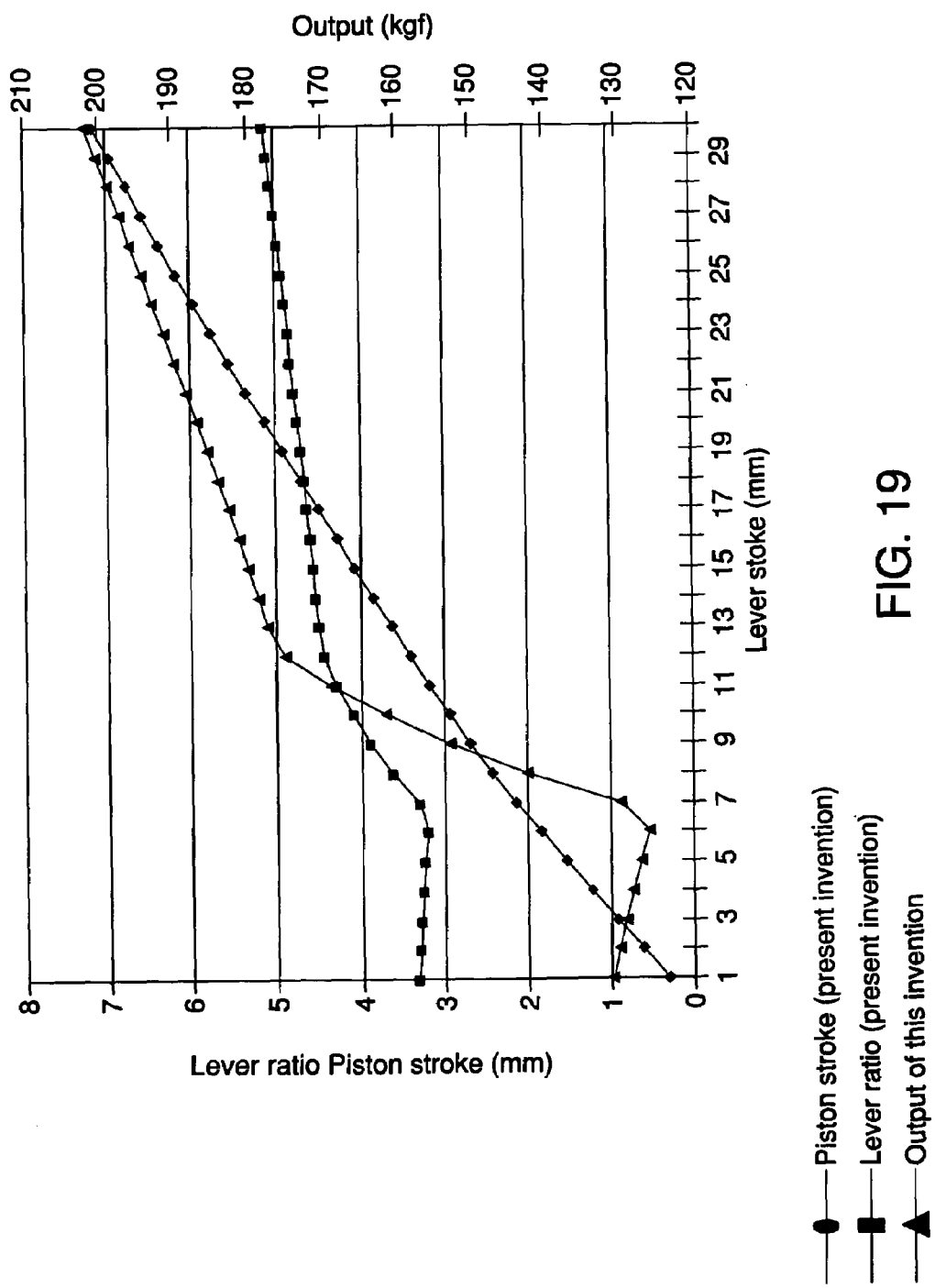
FIG. 19 is a table showing movement of the piston (piston stroke), the ratio of lever movement to piston movement and the braking force output.

The chart in FIG. 19 shows data corresponding to the first and second lever ratios with the left hand portion of the chart between the Lever Stroke (mm) distances of about 1-6 mm corresponding approximately to the conditions defining the first lever ratio and the left hand side of the chart beginning at Lever Stroke (mm) distances of greater than about 7 mm corresponding to the second lever ratio which is greater than the first lever ratio.

Second Embodiment

Referring now to FIGS. 11-17, a hydraulic brake actuation device 230 of a hydraulic braking system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 11:
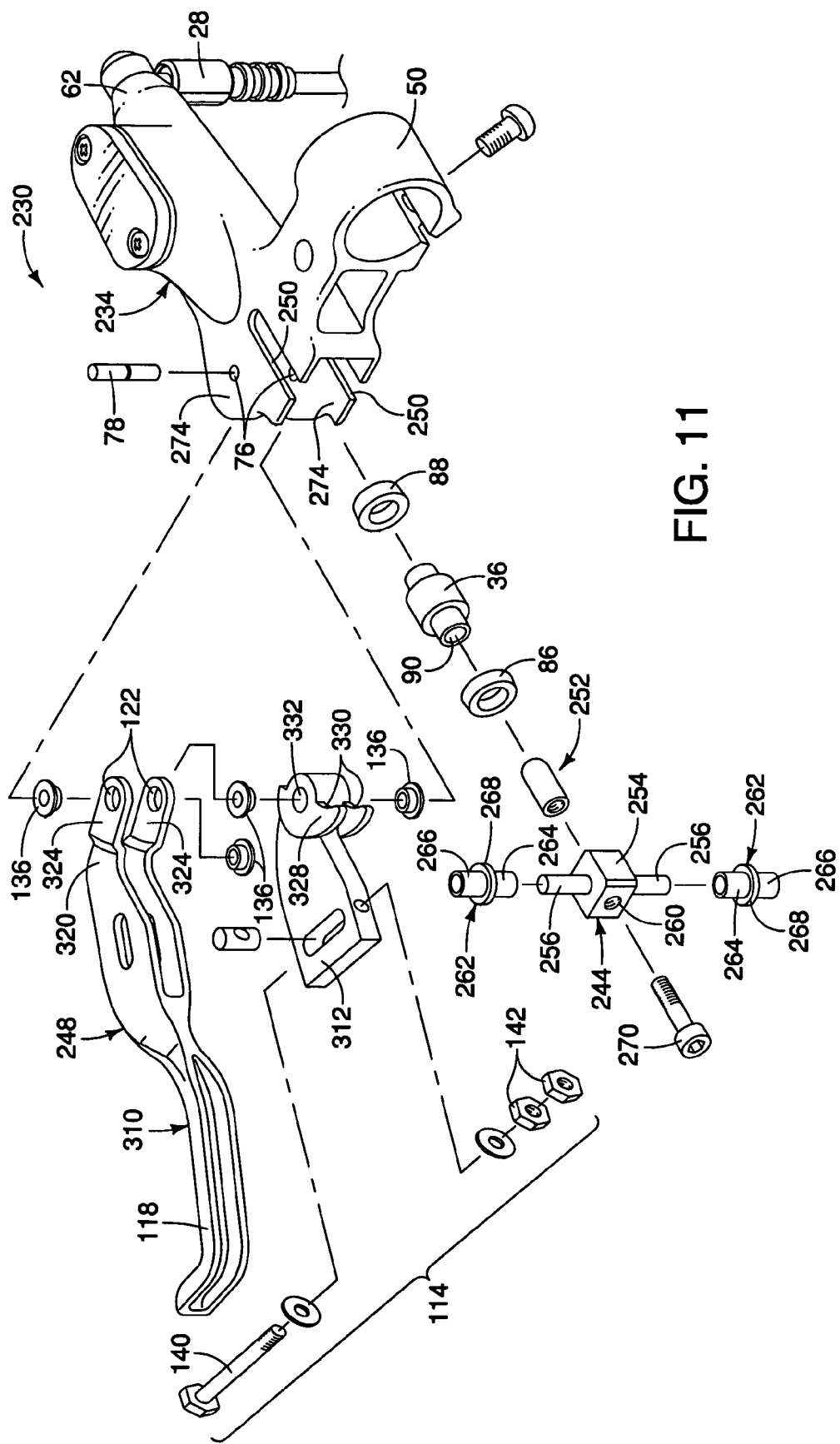
FIG. 11 is a perspective exploded view similar to FIG. 5, showing a hydraulic brake actuation device in accordance with a second embodiment of the present invention.
Figure 12:
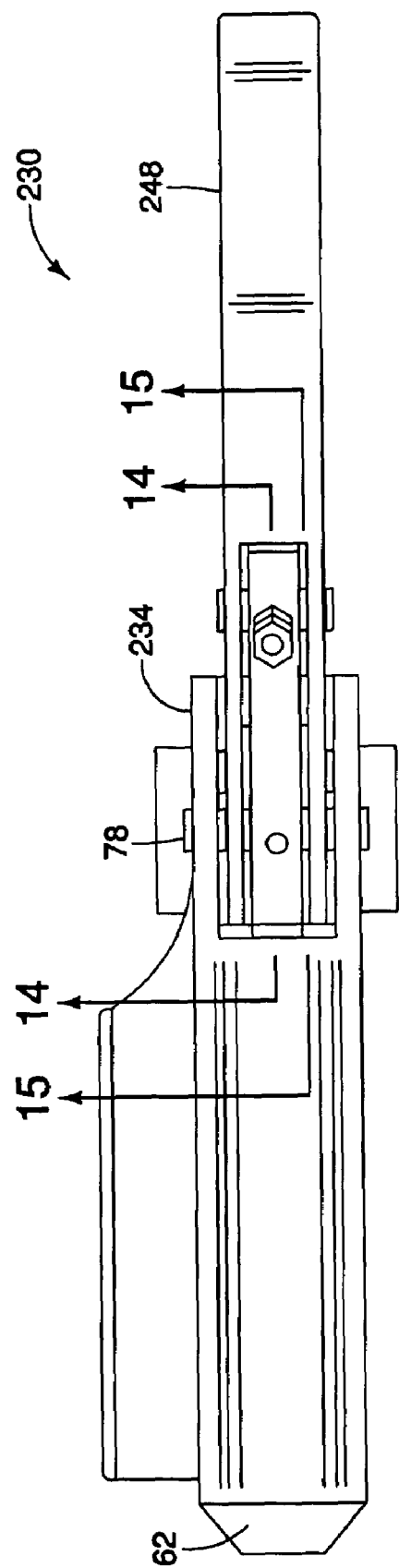
FIG. 12 is a side elevational view of the hydraulic brake actuation device depicted in FIG. 11 in accordance with the second embodiment of the present invention.
Figure 13:
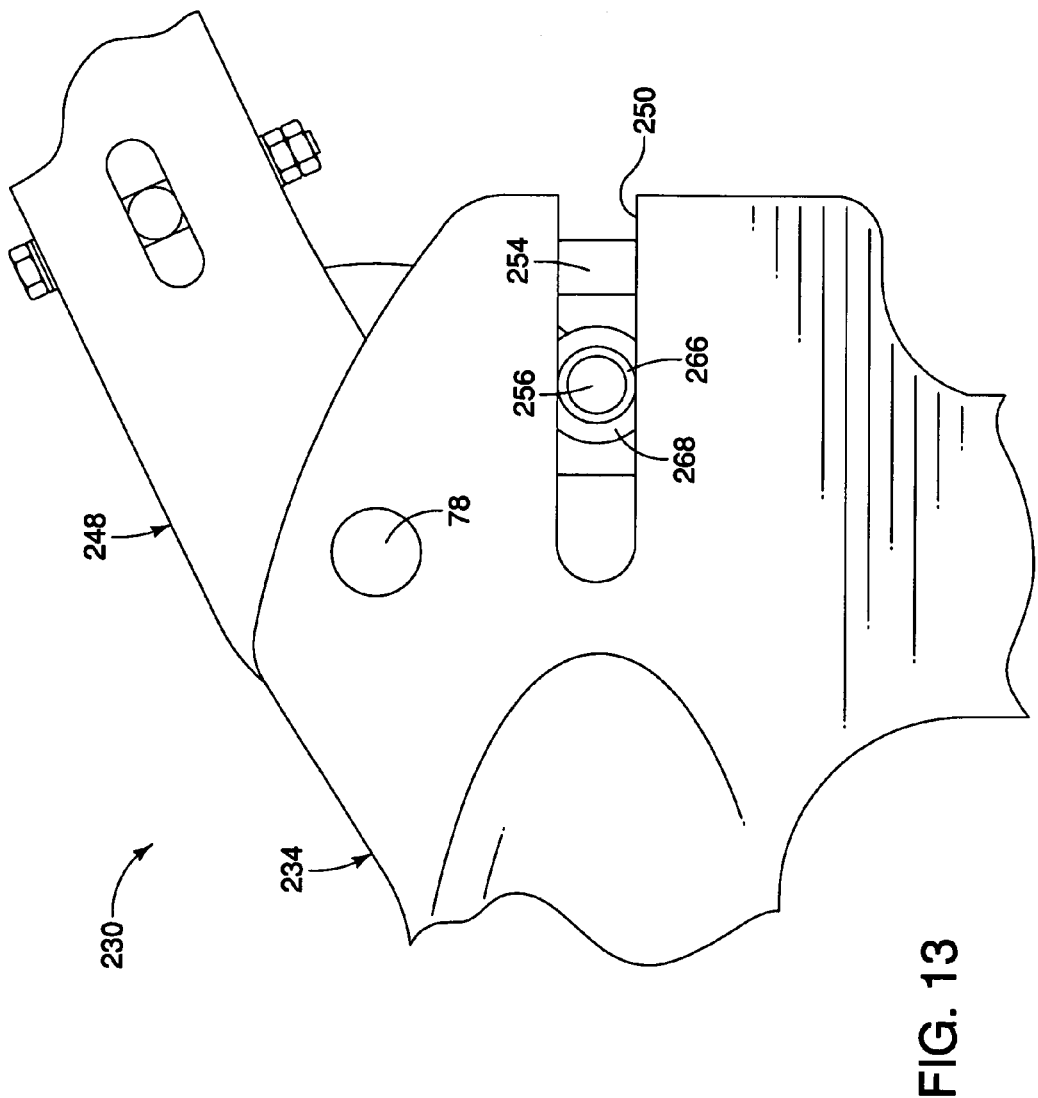
FIG. 13 is a fragmentary side view of the hydraulic brake actuation device depicted in FIGS. 11 and 12 in accordance with the second embodiment of the present invention.

As shown in FIG. 11, the hydraulic brake actuation device 230 has many features identical to the first embodiment. For instance, the hydraulic brake actuation device 230 includes the piston 36 but does not include the movement restricting portion 40 of the first embodiment. The hydraulic brake actuation device 230 does include a hydraulic master cylinder housing 234, a push rod 244 and a lever assembly 248 that include modification when compared to their counterparts in the first embodiment.

The hydraulic master cylinder housing 234 has many features that are identical to those of the hydraulic master cylinder housing 34 of the first embodiment, except the side walls 74 and the push rod supporting end 70 of the first embodiment have been modified. Specifically, the hydraulic master cylinder housing 234 includes side walls 274 that include slots 250 forming part of a movement restricting portion. Further, the threaded aperture 80 of the push rod supporting end 70 of the hydraulic master cylinder housing 34 of the first embodiment has been eliminated. Otherwise, the master cylinder housing 234 has the same features as the master cylinder housing 34 of the first embodiment.

The push rod 244 basically includes a piston contact portion 252 and a lever contact portion 254. The piston contact portion 252 has a hollow interior and a master piston contact end that conforms to the concaved surface the push rod receiving end 90 of the piston 36. The lever contact portion 254 includes a pair of shafts 256 that extend from opposite sides of the lever contact portion 254 and a central threaded aperture 260. A pair of rollers 262 are disposed on the shafts 256. Each roller 262 includes a first roller area 264, a second roller area 266 and an annular protrusion 268 extending therebetween. The rollers 262 are configured such that the first roller areas 264 serve as cam surface contact portions, the second roller areas 266 extend into the slots 250. The annular protrusion 268 contacts an inner surface of the side walls 274 to guide the push rod 244 thereby preventing side to side movement of the push rod 244.

Specifically, the second roller areas 266 and the slots 250 define a movement restricting portion and a push rod supporting end that restricts the push rod 244 to linear movement within the hydraulic master cylinder housing 234. The second roller areas 266 and the slots 250 further serve as a guide portion of the push rod 244.

Figure 14:
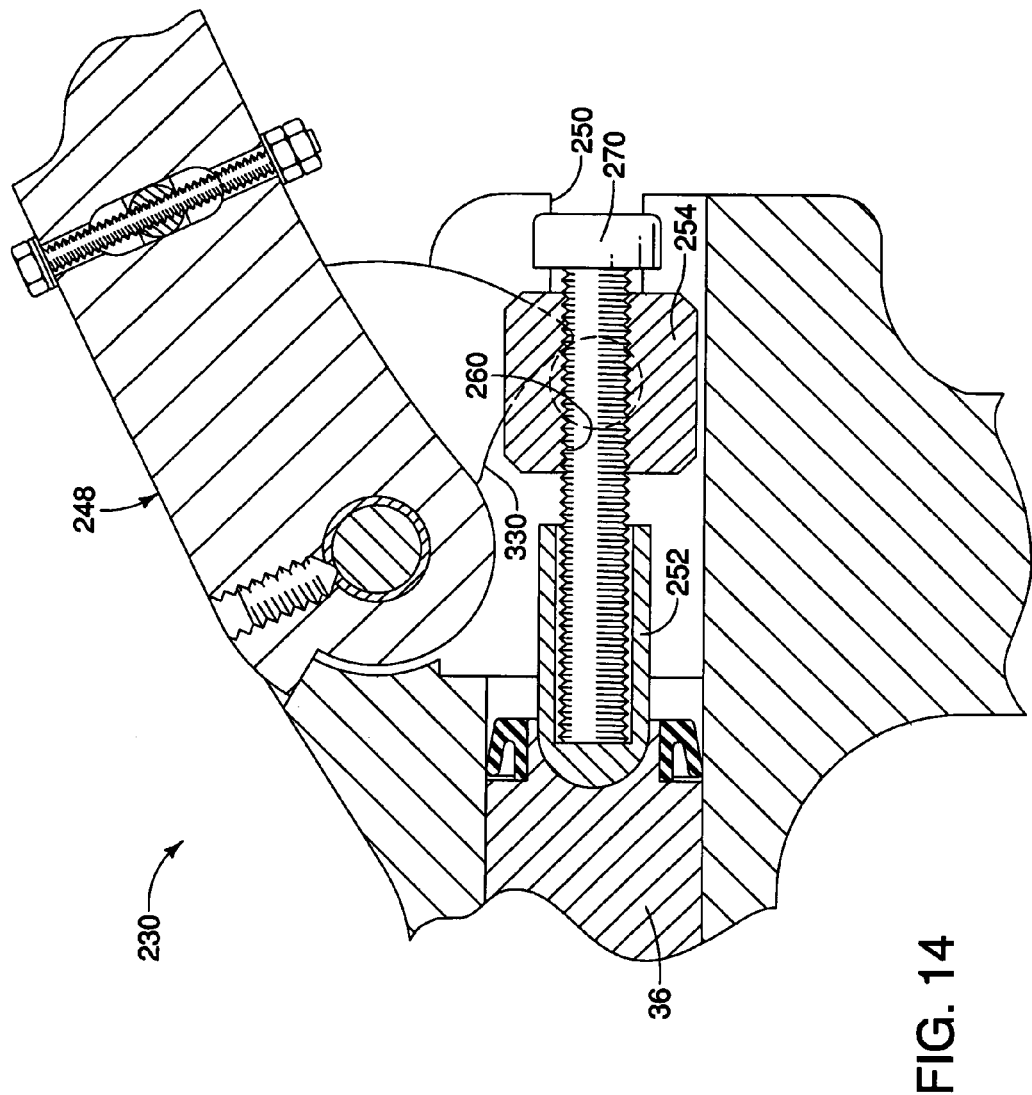
FIG. 14 is a cross-sectional view of the hydraulic brake actuation device taken along the line 14-14 in FIG. 12 showing details of a lever, a push rod and a piston with the lever in an at rest position and the piston in a neutral position in accordance with the second embodiment of the present invention.

An adjuster bolt 270 is installed into the central threaded aperture 260 of the lever contact portion 254 of the push rod 244. The adjuster bolt 270 is dimensioned such that a portion of the adjuster bolt 270 extends through the central threaded aperture 260. An exposed portion of the adjuster bolt 270 extends into the hollow interior of the piston contact portion 252 as shown in FIG. 14 and provides a positioning adjustment between the push rod 244 and piston 36.

Figure 15:
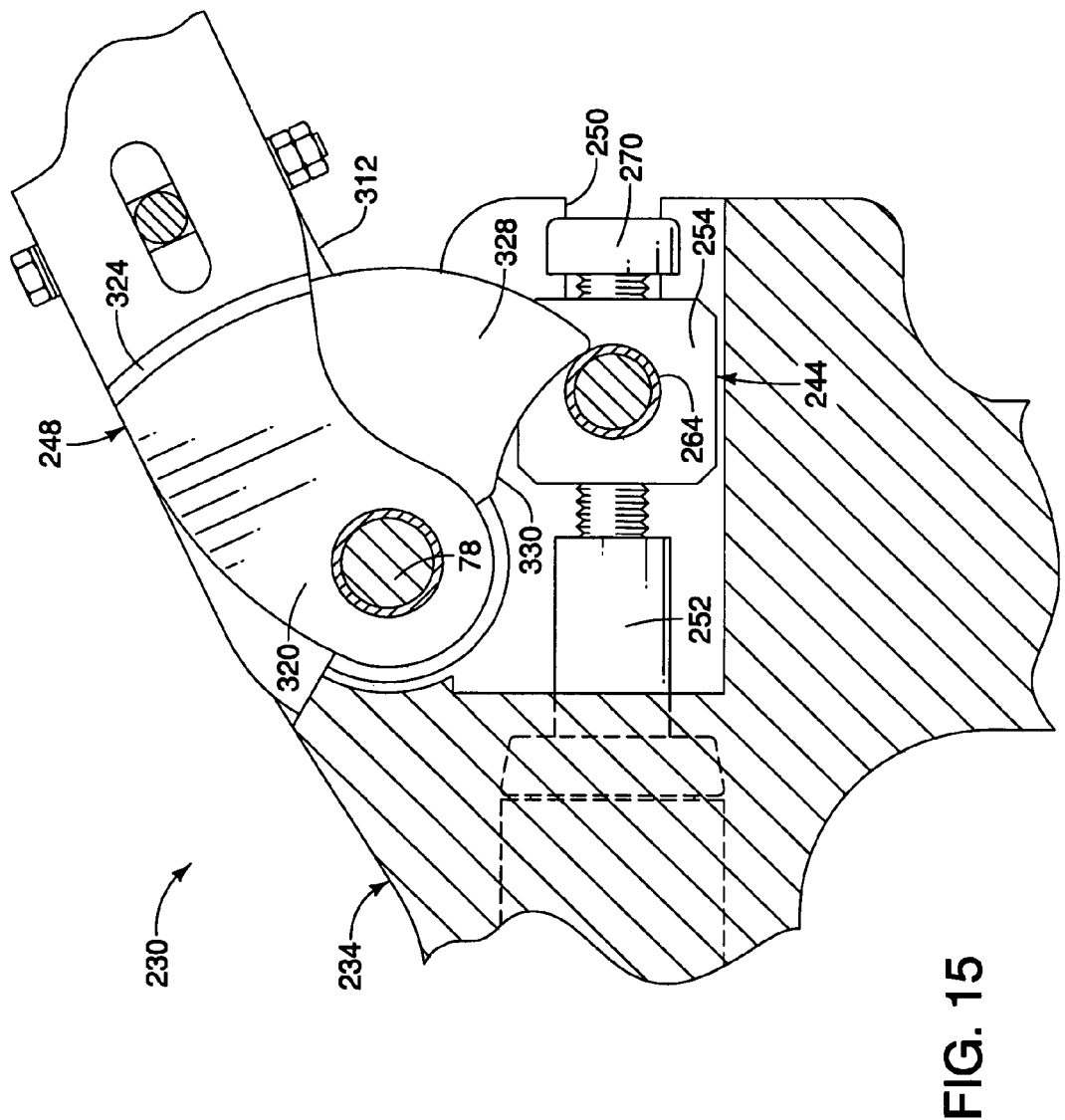
FIG. 15 is a cross-sectional view of the hydraulic brake actuation device taken along the line 15-15 in FIG. 12 showing a cam surface on the lever in contact with a roller of the push rod with the lever in the rest position and the piston in a neutral position in accordance with the second embodiment of the present invention.
Figure 16:
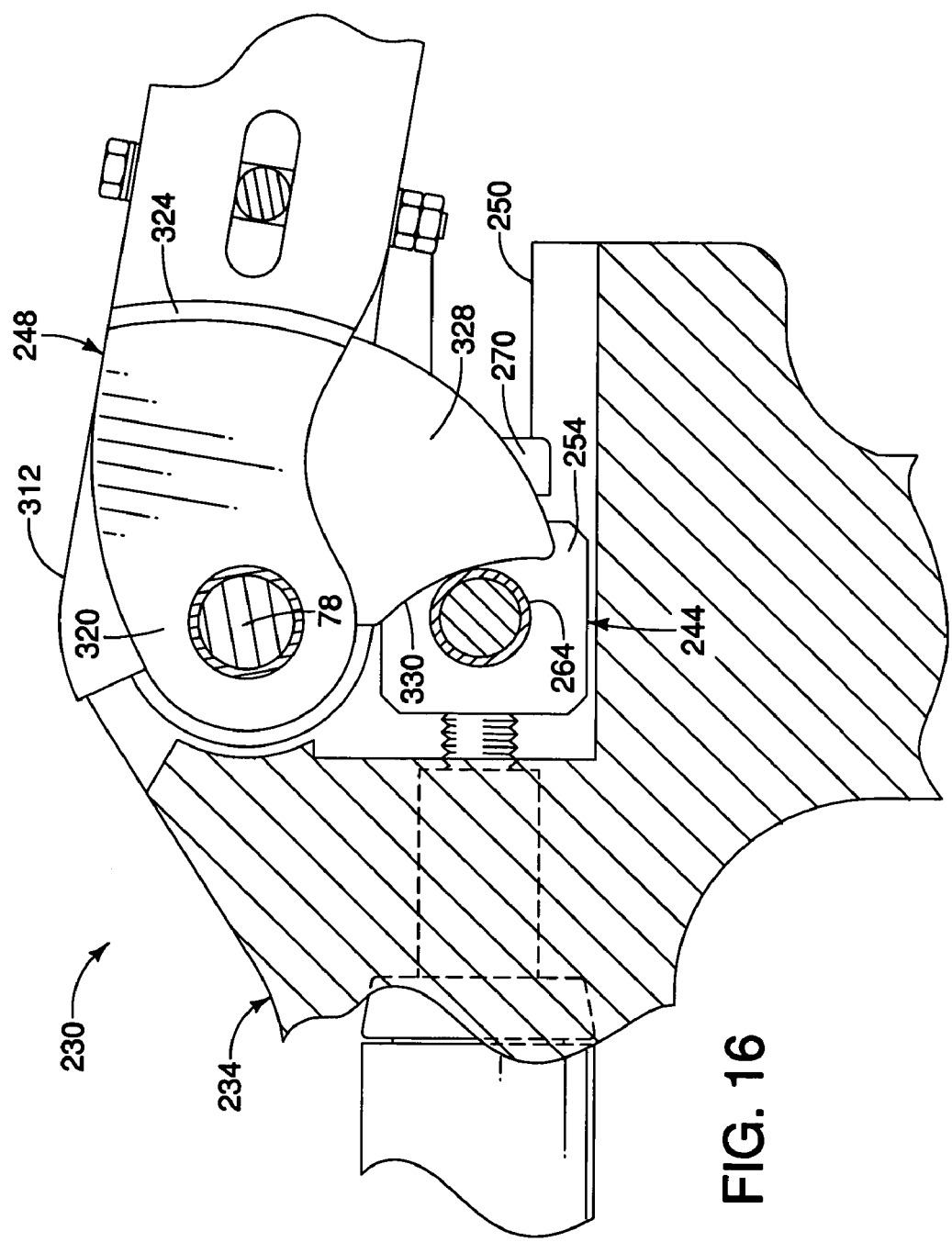
FIG. 16 is a cross-sectional view of the hydraulic brake actuation device similar to FIG. 15, with the lever in a brake actuation position and the piston in a braking position in accordance with the second embodiment of the present invention.
Figure 17:
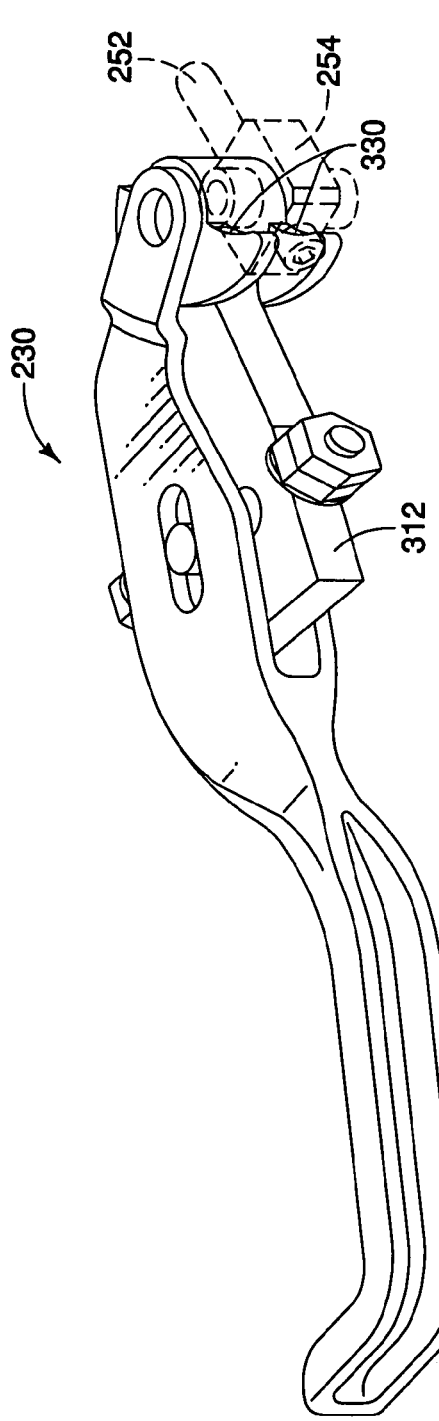
FIG. 17 is a perspective view of the lever and the push rod of the hydraulic brake actuation device showing a pair of cam surfaces of the lever in contact with a pair of rollers of the push rod in accordance with the second embodiment of the present invention.

As shown in FIGS. 15 and 16, the lever assembly 248 is pivotally attached to the hydraulic master cylinder housing 234 by the pivot pin 78 for pivotal movement between an at rest position shown in FIG. 15 and a brake actuation position shown in FIG. 16. As shown more clearly in FIG. 11, the lever assembly 248 basically includes a lever member 310, a block member 312 and the reach adjustment mechanism 114. The lever member 310 includes the grip end 118 and a pair of generally parallel extensions 320 extending from the grip end 118. Each of the extensions 320 are similar to the extensions 120 of the first embodiment, but have been modified to include an offset 324. Offsets 324 are formed with the apertures 122.

With reference again to FIGS. 15 and 16, the block member 312 includes a cam surface that is defined on a pair of cam protrusions 328. Each cam protrusion 328 has a cam surface area 330. The two cam surface areas 330 define the cam surface of the block member 312. As shown more clearly in FIG. 11, the block member 312 also includes an aperture 332 and the elongated slot 134 which is part of the reach adjustment mechanism 114.

The lever assembly 248 is pivotally supported on the hydraulic master cylinder housing 234 by the pivot pin 78. Specifically, bushings 136 are installed in each of the apertures 122 of the lever member 310 and in the aperture 332 of the block member 312. Further, the pivot pin 78 is inserted into the bores 76, the aperture 332 and the apertures 122 to support the lever assembly 248 on the hydraulic master cylinder housing 234.

As is shown in FIGS. 15 and 16, the cam surface areas 330 (contact surface) are configured and arranged to move the push rod 244 as the lever assembly 248 is pivoted between the at rest position (FIG. 15) and the brake actuation position (FIG. 16). As should be clear from the drawings, the cam surface areas 330 are spaced apart in order to extend to opposite sides of the push rod 244 and contact the second roller areas 266 of the rollers 262. It should be noted that the cam surface areas 330 are contoured or arcuate in shape thereby further enhancing the first and lever ratios defined above with respect to the first embodiment.

Third Embodiment

Figure 18:
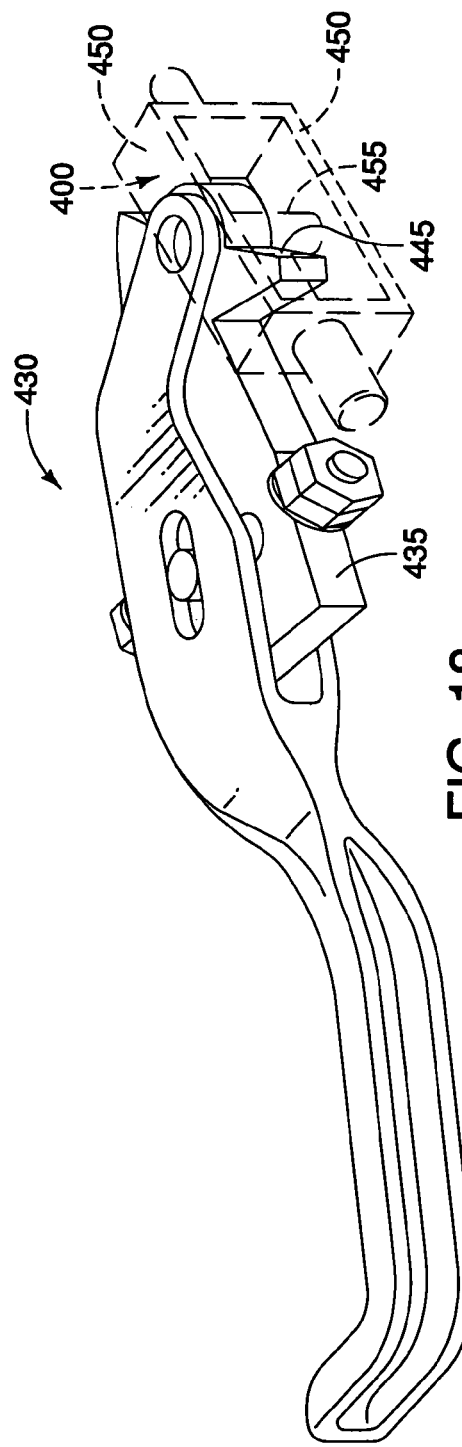
FIG. 18 is a perspective view of a lever and a push rod of a hydraulic brake actuation device showing a single cam surface of a lever in contact with a single roller of a push rod in accordance with a third embodiment of the present invention.

Referring now to FIG. 18, a hydraulic brake actuation device 430 of a hydraulic braking system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The hydraulic brake actuation device 430 is identical to the hydraulic brake actuation device 30 of the first embodiment except that the block member 112 has been replaced with a block member 435 and the push rod 44 has been replaced with a push rod 440. The block member 435 includes only a single cam surface area 445. The push rod 440 includes a cam surface contacting portion 445 that includes first and second support walls 450 with a single roller 455 rotatably supported therebetween, the roller being configured to contact the cam surface area 445.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hydraulic brake actuation device comprising:
   a hydraulic master cylinder housing having a bore and a push rod guide surface;
   a master piston and a radial seal received in the bore;
   a push rod supported by the push rod guide surface for sliding movement within the hydraulic master cylinder housing, the push rod being configured to move the master piston and the radial seal from a neutral position to a braking position; and
   a lever pivotally attached to the housing for pivotal movement between an at rest position and a brake actuation position, the lever being configured and arranged to move the push rod and the master piston from the neutral position toward the braking position as the lever is pivoted between the at rest position and the brake actuation position,
   the push rod including a piston contact portion, a lever contact portion and a guided portion, with the lever contact portion being disposed between the contact portion and the guided portion and the guided portion being supported by the push rod guide surface.

2. The bicycle hydraulic brake actuation device as set forth in claim 1, wherein
   the lever contact portion of the push rod includes a roller configured to contact a portion of the lever.

3. The bicycle hydraulic brake actuation device as set forth in claim 2, wherein
   the roller is supported for rotational movement to the lever contact portion of the push rod.

4. The bicycle hydraulic brake actuation device as set forth in claim 1, wherein
   the lever contact portion of the push rod includes a first roller and a second roller spaced apart from one another and configured to contact portions of the lever.

5. The bicycle hydraulic brake actuation device as set forth in claim 4, wherein
   the first and the second rollers are rotatably supported on opposite sides of the lever contact portion of the push rod.

6. The bicycle hydraulic brake actuation device as set forth in claim 1, wherein
   the push rod guide surface of the hydraulic master cylinder housing is configured to restrict the push rod to linear movement along an axis that is coaxial with the bore.

7. The bicycle hydraulic brake actuation device as set forth in claim 1, wherein
   the lever contact portion of the push rod includes first and second support walls with a roller rotatably supported therebetween, the roller being configured to contact a portion of the lever.

8. The bicycle hydraulic brake actuation device as set forth in claim 1, wherein
   the push rod guide surface has an annular shape and encircles a portion of the push rod.

* * * * *